(12) United States Patent
Komatsu et al.

(10) Patent No.: US 7,786,036 B2
(45) Date of Patent: Aug. 31, 2010

(54) DIELECTRIC PORCELAIN COMPOSITION, AND METHOD FOR MANUFACTURING CAPACITOR USING THE SAME

(75) Inventors: Kazuhiro Komatsu, Hokkaido (JP); Kazuki Hirata, Aichi (JP); Atsuo Nagai, Osaka (JP); Tadashi Onomi, Hokkaido (JP); Kenji Oka, Hokkaido (JP)

(73) Assignee: Panasonic Corporation, Osaka (JP)

( * ) Notice: Subject to any disclaimer, the term of this patent is extended or adjusted under 35 U.S.C. 154(b) by 441 days.

(21) Appl. No.: 11/795,128

(22) PCT Filed: Mar. 24, 2006

(86) PCT No.: PCT/JP2006/305915

§ 371 (c)(1),
(2), (4) Date: Jul. 12, 2007

(87) PCT Pub. No.: WO2006/104026

PCT Pub. Date: Oct. 5, 2006

(65) Prior Publication Data

US 2008/0115876 A1 May 22, 2008

(30) Foreign Application Priority Data

Mar. 28, 2005 (JP) ............................. 2005-090894

(51) Int. Cl.
*C04B 35/468* (2006.01)
(52) U.S. Cl. ................................................... 501/139
(58) Field of Classification Search ................. 501/135, 501/139
See application file for complete search history.

(56) References Cited

U.S. PATENT DOCUMENTS

| 5,646,081 A | * | 7/1997 | Nishiyama et al. .......... 501/138 |
| 6,344,427 B1 | | 2/2002 | Komatsu et al. |
| 6,613,706 B2 | * | 9/2003 | Hagiwara et al. ........... 501/134 |

FOREIGN PATENT DOCUMENTS

| CN | 1293645 | | 5/2001 |
| JP | 61-155255 | | 7/1986 |
| JP | 2002-029835 | | 1/2002 |
| JP | 2002029836 | * | 1/2002 |
| JP | 2004-238251 | | 8/2004 |

OTHER PUBLICATIONS

Chinese Office Action issued in Chinese Patent Application No. CN 2006800080512, mailed Dec. 19, 2008.

* cited by examiner

*Primary Examiner*—Karl E Group
(74) *Attorney, Agent, or Firm*—McDermott Will & Emery LLP

(57) ABSTRACT

A dielectric ceramic composition containing at least 0.15 to 2.5 mol of a Mg compound in terms of MgO, 0 to 1.6 mol of a Ba compound in terms of $BaCO_3$, 0.1 to 3.0 mol of a Ln (Ln includes two or three kinds of elements selected from Er, Dy, and Ho with Er being essential) compound in terms of $Ln_2O_3$, 0.01 to 0.4 mol of a Mn compound in terms of $MnO_{4/3}$, 0.01 to 0.26 mol of a V compound in terms of $V_2O_5$, 0.3 to 3.5 mol of a Si compound in terms of $SiO_2$, and 0.01 to 2.5 mol of an Al compound in terms of $Al_2O_3$ to 100 mol of barium titanate adjusted for a Ba/Ti molar ratio of 0.997 to 1.007.

2 Claims, 3 Drawing Sheets

DIELECTRIC PORCELAIN COMPOSITION, AND METHOD FOR MANUFACTURING CAPACITOR USING THE SAME

RELATED APPLICATIONS

This application is the U.S. National Phase under 35 U.S.C. §371 of International Application No. PCT/JP2006/305915, filed on Mar. 24, 2006, which in turn claims the benefit of Japanese Application No. 2005-090894, filed on Mar. 28, 2005, the disclosures of which Applications are incorporated by reference herein.

TECHNICAL FIELD

The present invention relates to a dielectric ceramic composition, and a manufacturing method of a laminated ceramic capacitor formed by using the same.

BACKGROUND ART

FIG. 1 is a cross sectional view of general laminated ceramic capacitor 11 formed by using a dielectric ceramic composition. With reference to FIG. 1, laminated ceramic capacitor 11 is configured by electrically connecting inner electrodes 13 and 14 respectively to a pair of outer electrodes 18 and 19 formed on both opposed end faces 16 and 17 of sintered body 15. Then, this sintered body 15 is formed by sintering a laminated body formed by laminating a plurality of inner electrodes 13 and 14 alternatively by sandwiching a ceramic sheet formed in a sheet form which becomes dielectric layer 12 that is the dielectric ceramic composition after sintering and by laminating protective layers 20 top and bottom.

Then, an expensive precious metal is used in inner electrodes 13 and 14 and outer electrodes 18 and 19 in general to prevent a reaction with dielectric layer 12 at sintering. However, substitution has recently proceeded from an expensive precious metal to an inexpensive base metal such as nickel (Ni).

A conventional manufacturing method is explained below on laminated ceramic capacitor 11 configured as above.

First, a laminated body (not shown) is obtained by laminating alternatively a plurality of layers of a ceramic sheet that is an origin to be dielectric layer 12 after sintering and an electrode paste containing a base metal material such as Ni to be inner electrodes 13 and 14 after sintering, laminating protective layers 20 on this top layer and bottom layer, and pressure-bonding. Then, after cutting this laminated body into a chip shape with a prescribed size, sintering is performed at a prescribed temperature. At this time, sintered body 15 is formed by performing sintering in a reduced atmosphere such as a nitrogen gas atmosphere to prevent oxidative deterioration of inner electrodes 13 and 14.

Then, an external electrode paste comprising a base metal material is applied onto both end faces 16 and 17 of sintered body 15 where inner electrodes 13 and 14 are exposed, and baking is performed in a reduced atmosphere such as a nitrogen gas atmosphere so that external electrodes 18 and 19 do not oxidatively deteriorate.

Japanese Patent Unexamined Publication No. 61-155255 is known for example as prior technical document information relating to a dielectric ceramic composition suppressing reduction deterioration at such sintering of dielectric layer 12.

However, a laminated ceramic capacitor using the dielectric ceramic composition shown in Japanese Patent Unexamined Publication No. 61-155255 has large deterioration of the insulation resistance lifetime characteristic (IR lifetime characteristic). In addition, ensuring of reliability becomes more difficult as dielectric layer 12 becomes thinner and it has a problem that the temperature variation rate of capacitance becomes large. Furthermore, when copper (Cu) that is easy to generate a solid solution with Ni of inner electrodes 13 and 14 is selected as external electrodes 18 and 19 and it is baked to sintered body 15 in a reduced atmosphere, dielectric layer 12 is reduced and there is a problem that insulation resistance of the laminated ceramic capacitor becomes small.

DISCLOSURE OF THE INVENTION

The dielectric ceramic composition of the present invention contains at least 0.15 to 2.5 mol of a Mg compound in terms of MgO, 0 to 1.6 mol of a Ba compound in terms of $BaCO_3$, 0.1 to 3.0 mol of a Ln (Ln includes two or three kinds of elements selected from Er, Dy, and Ho with Er being essential) compound in terms of $Ln_2O_3$, 0.01 to 0.4 mol of a Mn compound in terms of $MnO_{4/3}$, 0.01 to 0.26 mol of a V compound in terms of $V_2O_5$, 0.3 to 3.5 mol of a Si compound in terms of $SiO_2$, and 0.01 to 2.5 mol of an Al compound in terms of $Al_2O_3$ as accessory components to 100 mol of barium titanate with the Ba/Ti molar ratio adjusted to 0.997 to 1.007 as a main component.

The manufacturing method of a capacitor of the present invention contains a mixing step of mixing ceramic powders containing at least 0.15 to 2.5 mol of a Mg compound in terms of MgO, 0 to 1.6 mol of a Ba compound in terms of $BaCO_3$, 0.1 to 3.0 mol of a Ln (Ln includes two or three kinds of elements selected from Er, Dy, and Ho with Er being essential) compound in terms of $Ln_2O_3$, 0.01 to 0.4 mol of a Mn compound in terms of $MnO_{4/3}$, 0.01 to 0.26 mol of a V compound in terms of $V_2O_5$, 0.3 to 3.5 mol of a Si compound in terms of $SiO_2$, and 0.01 to 2.5 mol of an Al compound in terms of $Al_2O_3$ as accessory components to 100 mol of barium titanate with the Ba/Ti molar ratio adjusted to 0.997 to 1.007 as a main component, a slurry producing step of producing a ceramic slurry using the ceramic powders after mixing, a ceramic sheet forming step of producing a ceramic sheet from the ceramic slurry, a laminating step of producing a laminated body by laminating alternatively the ceramic sheet and inner electrodes having a base metal as a main component, a sintering step of obtaining a sintered body including the inner electrodes and a dielectric layer by sintering the laminated body, and an external electrodes forming step of forming a pair of external electrodes on an end face where the inner electrodes of the sintered body are exposed.

EXPLANATION OF SYMBOLS

Figure 1:
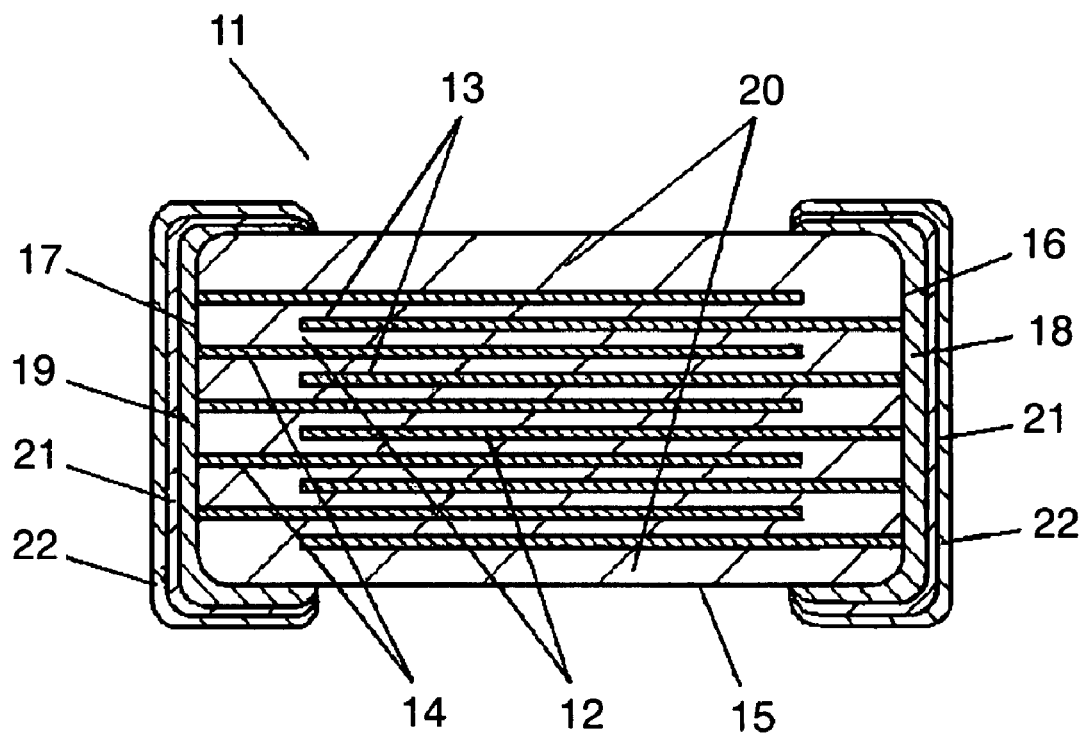
FIG. 1 shows a cross sectional view of a general laminated ceramic capacitor.

11 Laminated ceramic capacitor
12 Dielectric layer
13, 14 Inner electrodes
15 Sintered body
16, 17 End faces of sintered body
18, 19 External electrodes
20 Protective layer 21 Nickel-plated layer
22 Solder-plated layer

BEST MODES FOR CARRYING OUT OF THE INVENTION

Embodiment 1

Hereinafter, Embodiment 1 of the dielectric ceramic composition of the present invention is explained using a laminated ceramic capacitor as an example using FIG. 1.

FIG. 1 shows a cross sectional view of general laminated ceramic capacitor 11. With reference to FIG. 1, laminated ceramic capacitor 11 is formed by exposing inner electrodes 13 and 14 on both opposed end faces 16 and 17 of sintered body 15. In addition, it is configured by electrically connecting inner electrodes 13 and 14 respectively to a pair of outer electrodes 18 and 19 formed on both opposed end faces 16 and 17 of sintered body 15. Then, this sintered body 15 is formed by sintering a laminated body formed by laminating a plurality of inner electrodes 13 and 14 alternatively by sandwiching a ceramic sheet formed in a sheet form which becomes dielectric layer 12 that is the dielectric ceramic composition after sintering and by laminating protective layers 20 top and bottom. Nickel (Ni)-plated layer 21 is formed on each surface of this pair of external electrodes 18 and 19, and solder-plated layer 22 is formed on the surface of this Ni-plated layer 21.

The manufacturing method of such laminated ceramic capacitor 11 is described in detail below.

First, a manufacturing method for producing a ceramic sheet from ceramic powders as a starting material is explained.

Each of barium carbonate ($BaCO_3$), erbium oxide ($Er_2O_3$), dysprosium oxide ($Dy_2O_3$), holmium oxide ($Ho_2O_3$), magnesium oxide (MgO), manganese oxide ($MnO_{4/3}$), silicon dioxide ($SiO_2$), vanadium oxide ($V_2O_5$), and aluminum oxide ($Al_2O_3$) is weighed so that each starting material has a composition shown in Table 1 to 100 mol of barium titanate ($BaTiO_3$). Then, after wet mixing and milling is performed for 3.5 hours using a medium stirring mill and an yttria partially stabilized zirconia ball as a medium, dehydrating and drying is performed. $MnO_{4/3}$ is calculated so that it is regarded that ⅓ mol of $Mn_3O_4$ corresponds to 1 mol of $MnO_{4/3}$ and weighed using $Mn_3O_4$.

Moreover, a specific surface area obtained by a BET method (a Brunauer-Emmet-Teller adsorption isothermal equation) of $BaTiO_3$ that becomes a main material is shown in Table 1.

TABLE 1

| Sample number | Ba/Ti Molar ratio | Specific surface area of $BaTiO_3$ ($m^2$/g) | Accessory components (number of moles to 100 mol of $BaTiO_3$) | | | | | |
|---|---|---|---|---|---|---|---|---|
| | | | $BaCO_3$ | MgO | $Er_2O_3$ | $Dy_2O_3$ | $Ho_2O_3$ | $Ln_2O_3$ Total |
| *1 | 0.996 | 4.2 | 0.4 | 2.0 | 0.3 | 0.3 | 0.4 | 1.0 |
| 2 | 0.997 | 4.3 | 0.4 | 2.0 | 0.3 | 0.3 | 0.4 | 1.0 |
| 3 | 1.000 | 4.3 | 0.4 | 2.0 | 0.3 | 0.3 | 0.4 | 1.0 |
| 4 | 1.005 | 4.3 | 0.4 | 2.0 | 0.3 | 0.3 | 0.4 | 1.0 |
| 5 | 1.007 | 4.4 | 0.4 | 2.0 | 0.3 | 0.3 | 0.4 | 1.0 |
| *6 | 1.010 | 4.3 | 0.4 | 2.0 | 0.3 | 0.3 | 0.4 | 1.0 |
| *7 | 1.001 | 2.7 | 0.4 | 2.0 | 0.3 | 0.3 | 0.4 | 1.0 |
| 8 | 1.001 | 3.0 | 0.4 | 2.0 | 0.3 | 0.3 | 0.4 | 1.0 |
| 9 | 1.001 | 8.0 | 0.4 | 2.0 | 0.3 | 0.3 | 0.4 | 1.0 |
| *10 | 1.001 | 8.5 | 0.4 | 2.0 | 0.3 | 0.3 | 0.4 | 1.0 |

| Sample number | Accessory components (number of moles to 100 mol of $BaTiO_3$) | | | |
|---|---|---|---|---|
| | $MnO_{3/4}$ | $SiO_2$ | $V_2O_5$ | $Al_2O_3$ |
| *1 | 0.2 | 0.6 | 0.15 | 0.25 |
| 2 | 0.2 | 0.6 | 0.15 | 0.25 |
| 3 | 0.2 | 0.6 | 0.15 | 0.25 |
| 4 | 0.2 | 0.6 | 0.15 | 0.25 |
| 5 | 0.2 | 0.6 | 0.15 | 0.25 |
| *6 | 0.2 | 0.6 | 0.15 | 0.25 |
| *7 | 0.2 | 0.6 | 0.15 | 0.25 |
| 8 | 0.2 | 0.6 | 0.15 | 0.25 |
| 9 | 0.2 | 0.6 | 0.15 | 0.25 |
| *10 | 0.2 | 0.6 | 0.15 | 0.25 |

*represents the range outside the present invention

Next, after this dehydrated and dried mixed material is disintegrated and the whole amount is passed through a 32 mesh sieve, it is put in a crucible made from alumina, kept at a temperature of 700° C. to 1100° C. for 2 hours, and calcined. This calcination is performed at a temperature which brings a state where a carbonate is decomposed and $BaTiO_3$ as a main component and accessory components are moderately reacted. At this time, because the temperature variation rate of capacitance of the obtained laminated ceramic capacitor may become too large when the calcining temperature is too high, attention is necessary.

Then, after wet milling is performed on the calcined material so that the average particle diameter of the calcined material becomes 0.7 μm or less using a medium stirring mill in the same manner as in the step of mixing materials, dehydrating and drying is performed, the whole amount is passed through a 32 mesh sieve, and a dielectric material is produced. At this time, the milling is performed by adding $Al_2O_3$ to the calcined material after calcining. Here, the occurrence of a second phase can be prevented by adding $Al_2O_3$. Further, by adding $Al_2O_3$ at milling after calcining, a necessary amount or more of a solid solution of the calcined material can be prevented, and deterioration of the temperature characteristics can be prevented.

The average particle diameter of the calcined material is measured by a laser diffraction method.

A polyvinyl butyral resin as a binder, n-butyl acetate as a solvent, and dibutyl phthalate as a plasticizer are added in the produced ceramic material, it is mixed with an yttria partially stabilized zirconia ball for 3 hours with a medium stirring mill, and a slurry is produced.

The obtained slurry is applied onto a polyester film which becomes a support on which surface a silicon release agent is given using a doctor blade method, and a ceramic sheet to become dielectric layer 12 shown in FIG. 1 is formed after sintering. It is produced so that the thickness of this ceramic sheet is set to be 5 μm after sintering.

Next, the inner electrode paste having Ni as a main component is pattern-printed onto the surface of this ceramic sheet using a screen printing method, and drying is performed. After drying this ceramic sheet on which this Ni inner electrode paste is printed, 10 sheets of this are laminated, thermally compressed, and a laminated body is formed. After that, this laminated body is cut into a shape of a laminated green chip of 3.3 mm in length×1.7 mm in width (hereafter, abbreviated as a green chip).

Next, removal of organic substances such as a binder and a plasticizer is performed by mixing this green chip with zirconia placing powder, placing it in a sheath made from alumina, and sintering in an atmosphere where Ni is not oxidized excessively. After that, successively, in a reduced atmosphere constituted by mixing carbon dioxide gas or water vapor into nitrogen and hydrogen, where dielectric layer 12 can be sintered without oxidizing Ni excessively, sintering of the green chip is performed by maintaining a maximum temperature of 1180° C. to 1340° C. for 2 hours. Then, after maintaining this green chip at the maximum temperature, it is made to undergo a range of temperature of 800 to 1200° C. for 1 hour in the process of lowering the temperature. At this time, the process is performed in an atmosphere constituted by mixing carbon dioxide gas or water vapor into nitrogen and hydrogen and where Ni is not oxidized excessively. In this process of lowering the temperature, re-oxidation of dielectric layer 12 reduced in the sintering step in the reduced atmosphere is performed. After that, sintered body 15 is produced by cooling the green chip to room temperature.

Here, an example is explained in which re-oxidation of dielectric layer 12 reduced in the sintering step is performed in the process of lowering the temperature in the sintering step. However, it is not limited to this. For example, the re-oxidation step may be provided in which the green chip is re-oxidized by increasing the temperature to 800 to 1200° C. again after the sintering step.

Moreover, a temperature at which the density of each sintered body 15 including dielectric layer 12 becomes maximum is used as the optimum sintering temperature of each composition.

Next, the surface and the end faces of this sintered body are polished with a barrel polishing machine, and inner electrodes 13 and 14 are exposed to end faces 16 and 17 of sintered body 15. After that, an electrode paste to become external electrodes 18 and 19 having copper (Cu) as a main component is applied onto end faces 16 and 17 of sintered body 15, and baking is performed at 850° C. for 15 minutes in an atmosphere where nitrogen and oxygen are mixed and Cu is not oxidized excessively. In this step, external electrodes 18 and 19 are formed by being electrically connected to inner electrodes 13 and 14 exposed to end faces 16 and 17 of sintered body 15, respectively.

Next, Ni plated layer 21 is formed on the surface of each external electrode 18 and 19 using an electroplating method. Furthermore, solder plated layer 22 is formed on the surface of Ni plated layer 21, and laminated ceramic capacitor 11 having each composition shown in Table 1 and a cross-section structure shown in FIG. 1 is obtained.

A dielectric constant and a dielectric loss tangent (tan δ) at 20° C. at a frequency of 1 kHz are measured for produced laminated ceramic capacitor 11.

The dielectric constant is obtained by calculation from the area of the inner electrodes and the thickness of the dielectric layer of the laminated ceramic capacitor sample.

Further, a value of which the difference dC of a capacitance value in the temperature range of −55 to +125° C. from the capacitance value C at a temperature of 25° C. is calculated as the capacitance variation rate in which the difference is divided by the capacitance value C at a temperature of 25° C. is shown as dC/C (%) in Table 2. In Table 2, dC/C (%) (−55° C.) is the capacitance variation rate at a temperature of −55° C., and dC/C (%) (125° C.) is the capacitance variation rate at a temperature of 125° C. Moreover, sample numbers in Table 2 correspond to the sample numbers in Table 1.

Further, an insulation resistance (IR) value (Ω) when a direct current voltage of 25 V is applied at room temperature is also shown in Table 2. In Table 2, an insulation resistance value of $1.00×10^8$, for example, is shown as 1.00E+08. Furthermore, the IR degradation number after an accelerated lifetime test is performed in which a DC voltage of 100V is continuously applied for 250 hours at a temperature of 125° C. is shown in Table 2. Here, the IR degradation number is a number obtained by measuring the insulation resistance value of 50 samples after the accelerated lifetime test and counting the sample whose insulation resistance value is degraded to $1×10^7 Ω$ or less as degradation failures.

In Tables 1 and 2, * represents a laminated ceramic capacitor sample using a dielectric ceramic composition consisting of a composition outside the range of the present invention. It is obvious from Table 2 that the laminated ceramic capacitors of sample numbers 2 to 5, 8 to 9 using the dielectric ceramic composition of the present invention have a good dielectric constant and a good dielectric loss tangent (tan δ) value as initial performance. Further, deviation of these values is also small. Further, the insulation resistance value shows a good value, and the variation rate of capacitance dC/C (%) due to temperature is also small. Furthermore, the IR degradation number after the accelerated lifetime test is zero, which is also good.

TABLE 2

| Sample number | Dielectric constant | tanδ (%) | IR (Ω) | dC/C(%)(−55° C.) | dC/C(%)(125° C.) | IR Degradation number |
|---|---|---|---|---|---|---|
| *1  | 4300 | 5.2 | 1.00E+08 | −16.1 | −17.2 | 21/50 |
| 2   | 3400 | 2.2 | 1.20E+10 | −10.7 | −13.5 | 0/50 |
| 3   | 3200 | 2.1 | 1.90E+10 | −11.2 | −12.7 | 0/50 |
| 4   | 2900 | 1.9 | 2.10E+10 | −10.2 | −12.4 | 0/50 |
| 5   | 2200 | 1.3 | 1.40E+10 | −9.9  | −11.1 | 0/50 |
| *6  | 1500 | 2.6 | 1.00E+08 | −8.9  | −9.9  | 12/50 |
| *7  | 3800 | 2.8 | 2.10E+10 | −10.7 | −11.2 | 4/50 |
| 8   | 3600 | 2.3 | 2.40E+10 | −13.2 | −12.8 | 0/50 |
| 9   | 2000 | 1.9 | 3.10E+10 | −9.8  | −10.2 | 0/50 |
| *10 | 1300 | 1.3 | 2.10E+10 | −19.2 | −25.2 | 0/50 |

*represents the range outside the present invention

Here, as with sample number 1, when a Ba/Ti ratio of $BaTiO_3$ is less than 0.997, the insulation resistance is low and degradation of the insulation resistance lifetime characteristics is severe. This is considered to be because reduction resistance is insufficient at sintering. On the other hand, as with sample number 6, when the Ba/Ti ratio exceeds 1.007, both the dielectric constant and the insulation resistance are low, and the sample is poor in the insulation resistance lifetime characteristics. This is because sintering is insufficient. Further, as shown in sample number 7, in the case that a specific surface area of a $BaTiO_3$ material is less than 3 m²/g, the initial characteristics are satisfied. However, the insulation resistance lifetime characteristics are insufficient in the case that the dielectric layer is made thin, and the IR degradation number becomes large. Furthermore, as with sample number 10, in the case that a specific surface area of a $BaTiO_3$ material exceeds 8 m²/g, because crystallinity of $BaTiO_3$ is insufficient, the dielectric constant is small, temperature dependency of the capacitance variation rate is large, and it is not practical. Moreover, $BaTiO_3$ produced by an oxalate method is used in a synthesis of $BaTiO_3$. However, the same effect can be obtained by using $BaTiO_3$ produced by a hydrothermal synthesis method, a solid phase method, etc. Further, in the case of using ones in which peaks of a (002) plane and a (200) plane are not separated where an x-ray diffraction angle 2θ in an x-ray diffraction chart is in the range of 40 to 50° as $BaTiO_3$ being a main component, the capacitance variation rate due to temperature becomes large and it is not practical. Therefore, $BaTiO_3$ in which the peaks of a (002) plane and a (200) plane are separated where the x-ray diffraction angle 2θ is in the range of 40 to 50° is effective.

Embodiment 2

Laminated ceramic capacitor 11 having a cross-section structure shown in FIG. 1 is produced in the same manner as in Embodiment 1 by weighing each of $BaCO_3$, $Er_2O_3$, $Dy_2O_3$, $Ho_2O_3$, MgO, $MnO_{4/3}$, $SiO_2$, $V_2O_5$, and $Al_2O_3$ so that each starting material has a composition shown in Table 3 to 100 mol of $BaTiO_3$. Here, $BaTiO_3$ with a Ba/Ti molar ratio of 1.001, a specific surface area of 4.3 m²/g, and in which the x-ray diffraction angle 2θ in the x-ray diffraction chart in the range of 40 to 50° is separated into two peaks of the (002) plane and the (200) plane is used for $BaTiO_3$ of a main material. Then, the dielectric constant and the dielectric loss tangent (tan δ) are measured at a temperature of 20° C. and a frequency of 1 kHz on produced laminated ceramic capacitor 11.

TABLE 3

| Sample number | Ba/Ti Molar ratio | Specific surface area of $BaTiO_3$ (m²/g) | Accessory components (number of moles to 100 mol of $BaTiO_3$) | | | | | |
|---|---|---|---|---|---|---|---|---|
| | | | $BaCO_3$ | MgO | $MnO_{4/3}$ | $SiO_2$ | $V_2O_5$ | $Al_2O_3$ |
| *11 | 1.001 | 4.3 | 0.4 | 2.0 | 0.2 | 0.6 | 0.15 | 0.25 |
| *12 | 1.001 | 4.3 | 0.4 | 2.0 | 0.2 | 0.6 | 0.15 | 0.25 |
| 13  | 1.001 | 4.3 | 0.4 | 2.0 | 0.2 | 0.6 | 0.15 | 0.25 |
| 14  | 1.001 | 4.3 | 0.4 | 2.0 | 0.2 | 0.6 | 0.15 | 0.25 |
| 15  | 1.001 | 4.3 | 0.4 | 2.0 | 0.2 | 0.6 | 0.15 | 0.25 |
| 16  | 1.001 | 4.3 | 0.4 | 2.0 | 0.2 | 0.6 | 0.15 | 0.25 |
| 17  | 1.001 | 4.3 | 0.4 | 2.0 | 0.2 | 0.6 | 0.15 | 0.25 |
| 18  | 1.001 | 4.3 | 0.4 | 2.0 | 0.2 | 0.6 | 0.15 | 0.25 |
| 19  | 1.001 | 4.3 | 0.4 | 2.0 | 0.2 | 0.6 | 0.15 | 0.25 |
| 20  | 1.001 | 4.3 | 0.4 | 2.0 | 0.2 | 0.6 | 0.15 | 0.25 |
| 21  | 1.001 | 4.3 | 0.4 | 2.0 | 0.2 | 0.6 | 0.15 | 0.25 |
| *22 | 1.001 | 4.3 | 0.4 | 2.0 | 0.2 | 0.6 | 0.15 | 0.25 |
| 23  | 1.001 | 4.3 | 0.4 | 2.0 | 0.2 | 0.6 | 0.15 | 0.25 |
| *24 | 1.001 | 4.3 | 0.4 | 2.0 | 0.2 | 0.6 | 0.15 | 0.25 |

TABLE 3-continued

| Sample number | Accessory components (number of moles to 100 mol of BaTiO$_3$) Ln$_2$O$_3$ | | | | Constitution ratio of Ln$_2$O$_3$ | | |
|---|---|---|---|---|---|---|---|
| | Er$_2$O$_3$ | Dy$_2$O$_3$ | Ho$_2$O$_3$ | Ln$_2$O$_3$ Total | x (Er$_2$O$_3$) | y (Dy$_2$O$_3$) | z (Ho$_2$O$_3$) |
| *11 | 0 | 0 | 0 | 0 | 0 | 0 | 0 |
| *12 | 0 | 0.30 | 0.70 | 1.0 | 0 | 0.30 | 0.70 |
| 13 | 0.05 | 0 | 0.95 | 1.0 | 0.05 | 0 | 0.95 |
| 14 | 0.07 | 0 | 1.43 | 1.5 | 0.05 | 0 | 0.95 |
| 15 | 0.20 | 0 | 0.80 | 1.0 | 0.20 | 0 | 0.80 |
| 16 | 1.20 | 1.20 | 0 | 2.4 | 0.50 | 0.50 | 0 |
| 17 | 0.50 | 0.50 | 0 | 1.0 | 0.50 | 0.50 | 0 |
| 18 | 0.50 | 0 | 0.50 | 1.0 | 0.50 | 0 | 0.50 |
| 19 | 0.05 | 0.95 | 0 | 1.0 | 0.05 | 0.95 | 0 |
| 20 | 0.02 | 0.04 | 0.04 | 0.1 | 0.20 | 0.40 | 0.40 |
| 21 | 0.90 | 0.90 | 1.20 | 3.0 | 0.30 | 0.30 | 0.40 |
| *22 | 0.90 | 1.00 | 1.20 | 3.1 | 0.29 | 0.32 | 0.39 |
| 23 | 0.60 | 0.60 | 0.80 | 2.0 | 0.30 | 0.30 | 0.40 |
| *24 | 0.90 | 0.30 | 0.30 | 1.5 | 0.60 | 0.20 | 0.20 |

*represents the range outside the present invention

Further, a value of which the difference dC of a capacitance value in the temperature range of −55 to +125° C. from a capacitance value C at a temperature of 25° C. is calculated as the capacitance variation rate in which the difference is divided by the capacitance value C at a temperature of 25° C. is shown as dC/C (%) in Table 4. Moreover, sample numbers in Table 4 correspond to the sample numbers in Table 3.

Further, an insulation resistance (IR) value (Ω) when a direct current voltage of 25 V is applied at room temperature is also shown. Furthermore, the IR degradation number after an accelerated lifetime test is performed in which a DC voltage of 100V is continuously applied for 250 hours at a temperature of 125° C. is shown in Table 4. Here, the IR degradation number is a number obtained by measuring the insulation resistance value of 50 samples after the accelerated lifetime test and counting the sample whose insulation resistance value is degraded to 1×10$^7$Ω or less as degradation failures. The notation of the insulation resistance value is the same as in Table 2. In Tables 3 and 4, * represents a laminated ceramic capacitor sample using a dielectric ceramic composition consisting of a composition outside the range of the present invention.

It is obvious from Table 4 that the laminated ceramic capacitors of sample numbers 13 to 21, and 23 using the dielectric ceramic composition of the present invention have a good dielectric constant and a good dielectric loss tangent (tan δ) value as initial performance, and deviation of these values is also small. Further, the temperature dependency of the insulation resistance and the capacitance variation rate, and the insulation resistance lifetime characteristics after the accelerated lifetime test are all good.

TABLE 4

| Sample number | Dielectric constant | tanδ (%) | IR(Ω) | dC/C(%)(−55° C.) | dC/C(%)(125° C.) | IR Degradation number |
|---|---|---|---|---|---|---|
| *11 | 3300 | 3.2 | 3.00E+09 | −7.2 | −6.2 | 42/50 |
| *12 | 3010 | 2.3 | 1.20E+10 | −14.4 | −15.2 | 1/50 |
| 13 | 3015 | 2.2 | 1.50E+10 | −12.1 | −14.2 | 0/50 |
| 14 | 2750 | 2.0 | 1.60E+10 | −11.9 | −13.7 | 0/50 |
| 15 | 2960 | 2.1 | 1.40E+10 | −12.2 | −14.4 | 0/50 |
| 16 | 2450 | 2.0 | 2.60E+10 | −9.8 | −11.8 | 0/50 |
| 17 | 2980 | 2.3 | 2.40E+10 | −8.9 | −10.9 | 0/50 |
| 18 | 3020 | 2.4 | 1.50E+10 | −7.9 | −9.9 | 0/50 |
| 19 | 3030 | 2.2 | 1.60E+10 | −11.8 | −13.5 | 0/50 |
| 20 | 3150 | 2.3 | 1.50E+10 | −12.2 | −14.2 | 0/50 |
| 21 | 2050 | 1.7 | 3.10E+10 | −7.9 | −9.8 | 0/50 |
| *22 | 1850 | 1.6 | 6.00E+09 | −6.9 | −8.8 | 7/50 |
| 23 | 2350 | 1.9 | 3.00E+10 | −8.2 | −10.7 | 0/50 |
| *24 | 2430 | 2.0 | 1.00E+10 | −7.1 | −8.8 | 3/50 |

*represents the range outside the present invention

Figure 2:
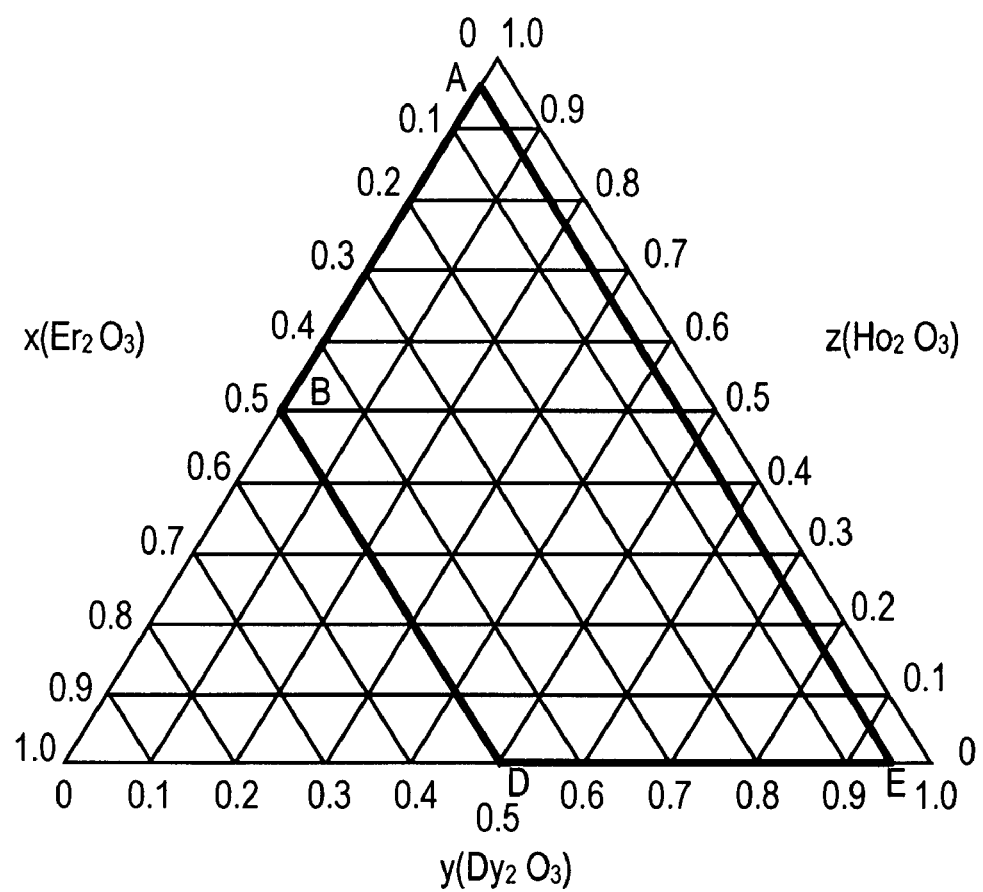
FIG. 2 shows a three-components constituent figure showing a constitutional ratio of Er—Dy—Ho (x, y, x).

Here, in sample number 11 in which the total amount of rare-earth oxides, Er$_2$O$_3$, Dy$_2$O$_3$, and Ho$_2$O$_3$ is 0.1 mol or less, a sufficient reduction resistance cannot be obtained, the insulation resistance value is low, and the insulation resistance lifetime characteristics are poor. Further, in sample number 22 in which the total amount of rare-earth oxides exceeds 3 mol, sintering is difficult, the dielectric constant is low, and the insulation resistance lifetime characteristics deteriorate. When Er$_2$O$_3$, Dy$_2$O$_3$, and Ho$_2$O$_3$ are represented as xEr$_2$O$_3$+yDy$_2$O$_3$+zHo$_2$O$_3$ (provided that, x+y+z=1), in the three-components constituent figure shown in FIG. 2, the coordinates of point A (x, y, z) are (0.05, 0, 0.95), the coordinates of point B (x, y, z) are (0.5, 0, 0.5), the coordinates of point D (x, y, z) are (0.5, 0.5, 0), and the coordinates of point E (x, y, z) are (0.05, 0.95, 0). Furthermore, in FIG. 2, in the case of the lower-left part from a straight line connecting points B and D, that is, sample number 24 in which a molar ratio x of $Er_2O_3$ exceeds 0.5, sintering is not sufficient, and the insulation resistance lifetime characteristics are lost although the initial characteristics are satisfied. Further, in the case of sample number 12 in which a molar ratio x of $Er_2O_3$ is less than 0.05, the temperature characteristics tend to deteriorate, the insulation resistance lifetime characteristics also tend to be lost, and it is not practical. Therefore, by combining $Er_2O_3$, $Dy_2O_3$, and $Ho_2O_3$ at an optimum ratio, the laminated ceramic capacitor configured with a dielectric layer made thin can be provided with good temperature characteristics and excellent insulation resistance lifetime characteristics. Moreover, using $Er_2O_3$, $Dy_2O_3$, and $Ho_2O_3$ in which a specific surface area obtained by a BET method is 7 to 15 m$^2$/g, having a spherical shape and fewer cohesion particles, dispersibility improves and the above-described remarkable effect can be obtained.

Embodiment 3

Laminated ceramic capacitor 11 having a cross-section structure shown in FIG. 1 is produced in the same manner as in Embodiment 1 by weighing each of $BaCO_3$, $Er_2O_3$, $Dy_2O_3$, $Ho_2O_3$, MgO, $MnO_{4/3}$, $SiO_2$, $V_2O_5$, and $Al_2O_3$ so that each starting material has a composition shown in Table 5 to 100 mol of $BaTiO_3$. Here, $BaTiO_3$ with a Ba/Ti molar ratio of 1.001, a specific surface area of 4.3 m$^2$/g, and in which the x-ray diffraction angle 2θ in the x-ray diffraction chart in the range of 40 to 50° is separated into two peaks of the (002) plane and the (200) plane is used for $BaTiO_3$. Then, the dielectric constant and the dielectric loss tangent (tan δ) are measured at a temperature of 20° C. and a frequency of 1 kHz on produced laminated ceramic capacitor 11.

TABLE 5

| | | Accessory components (number of moles to 100 mol of BaTiO$_3$) | | | | | | | |
|---|---|---|---|---|---|---|---|---|---|
| | | | | | Ln$_2$O$_3$ | | | | |
| Sample number | Ba/TiO$_3$ (mol) | BaCO$_3$ | MgO | Total number of moles of Ln$_2$O$_3$ | Number of moles of each compound of Ln$_2$O$_3$ | | | MnO$_{4/3}$ | SiO$_2$ |
| | | | | | Er$_2$O$_3$ | Dy$_2$O$_3$ | Ho$_2$O$_3$ | | |
| 25 | 100 | 0.60 | 0.23 | 2.50 | 0.50 | 1.00 | 1.00 | 0.2 | 0.6 |
| 26 | 100 | 0 | 0.30 | 0.90 | 0.20 | 0.30 | 0.40 | 0.2 | 0.6 |
| 27 | 100 | 0 | 2.50 | 1.10 | 0.30 | 0.40 | 0.40 | 0.2 | 0.6 |
| 28 | 100 | 0.43 | 2.00 | 0.43 | 0.10 | 0.13 | 0.20 | 0.2 | 0.6 |
| 29 | 100 | 1.60 | 0.34 | 0.34 | 0.08 | 0.10 | 0.16 | 0.2 | 0.6 |
| 30 | 100 | 1.50 | 0.15 | 0.49 | 0.12 | 0.22 | 0.15 | 0.2 | 0.6 |
| *31 | 100 | 0.17 | 2.50 | 0.67 | 0.21 | 0.24 | 0.22 | 0.2 | 0.6 |
| *32 | 100 | 1.50 | 1.50 | 0.33 | 0.10 | 0.09 | 0.14 | 0.2 | 0.6 |
| *33 | 100 | 1.60 | 0.21 | 0.32 | 0.10 | 0.08 | 0.14 | 0.2 | 0.6 |
| *34 | 100 | 0.19 | 0.56 | 3.00 | 0.80 | 1.00 | 1.20 | 0.2 | 0.6 |
| *35 | 100 | 1.88 | 0.12 | 2.00 | 0.50 | 0.60 | 0.90 | 0.2 | 0.6 |
| *36 | 100 | 0.31 | 0.12 | 1.29 | 0.37 | 0.37 | 0.55 | 0.2 | 0.6 |
| *37 | 100 | 1.70 | 0.36 | 0.36 | 0.10 | 0.10 | 0.16 | 0.2 | 0.6 |
| *38 | 100 | 0.43 | 2.60 | 1.30 | 0.30 | 0.50 | 0.50 | 0.2 | 0.6 |

| | Accessory components (number of moles to 100 mol of BaTiO$_3$) | | Constitution ratio of BaCO$_3$—MgO-Ln$_2$O$_3$ | | | Constitution ratio of Ln$_2$O$_3$ | | |
|---|---|---|---|---|---|---|---|---|
| Sample number | V$_2$O$_5$ | Al$_2$O$_3$ | u (BaCO$_3$) | v (MgO) | w (Ln$_2$O$_3$) | x (Er$_2$O$_3$) | y (Dy$_2$O$_3$) | z (Ho$_2$O$_3$) |
| 25 | 0.15 | 0.25 | 0.18 | 0.07 | 0.75 | 0.20 | 0.40 | 0.40 |
| 26 | 0.15 | 0.25 | 0 | 0.25 | 0.75 | 0.22 | 0.33 | 0.44 |
| 27 | 0.15 | 0.25 | 0 | 0.70 | 0.30 | 0.27 | 0.36 | 0.36 |
| 28 | 0.15 | 0.25 | 0.15 | 0.70 | 0.15 | 0.23 | 0.30 | 0.47 |
| 29 | 0.15 | 0.25 | 0.70 | 0.15 | 0.15 | 0.24 | 0.29 | 0.47 |
| 30 | 0.15 | 0.25 | 0.70 | 0.07 | 0.23 | 0.24 | 0.45 | 0.31 |
| *31 | 0.15 | 0.25 | 0.05 | 0.75 | 0.20 | 0.31 | 0.36 | 0.33 |
| *32 | 0.15 | 0.25 | 0.45 | 0.45 | 0.10 | 0.30 | 0.27 | 0.42 |
| *33 | 0.15 | 0.25 | 0.75 | 0.10 | 0.15 | 0.31 | 0.25 | 0.44 |
| *34 | 0.15 | 0.25 | 0.05 | 0.15 | 0.80 | 0.27 | 0.33 | 0.40 |
| *35 | 0.15 | 0.25 | 0.47 | 0.03 | 0.50 | 0.25 | 0.30 | 0.45 |
| *36 | 0.15 | 0.25 | 0.18 | 0.07 | 0.75 | 0.29 | 0.29 | 0.43 |
| *37 | 0.15 | 0.25 | 0.70 | 0.15 | 0.15 | 0.28 | 0.28 | 0.44 |
| *38 | 0.15 | 0.25 | 0.10 | 0.60 | 0.30 | 0.23 | 0.38 | 0.38 |

*represents the range outside the present invention

Further, a value of which the difference dC of a capacitance value in the temperature range of −55 to +125° C. from the capacitance value C at a temperature of 25° C. is calculated as the capacitance variation rate in which the difference is divided by the capacitance value C at a temperature of 25° C. is shown as dC/C (%) in Table 6. Moreover, sample numbers in Table 6 correspond to the sample numbers in Table 5.

Further, an insulation resistance value (Ω) when a direct current voltage of 25 V is applied at room temperature is also shown. Furthermore, the IR degradation number after an accelerated lifetime test is performed in which a DC voltage of 100V is continuously applied for 250 hours at a temperature of 125° C. is shown in Table 6. Here, the IR degradation number is a number obtained by measuring the insulation resistance value of 50 samples after the accelerated lifetime test and counting the sample whose insulation resistance value is degraded to $1\times10^7 \Omega$ or less as degradation failures. The notation of the insulation resistance value is the same as in Table 2. In Tables 5 and 6, * represents a laminated ceramic capacitor sample using a dielectric ceramic composition consisting of a composition outside the range of the present invention.

Figure 3:
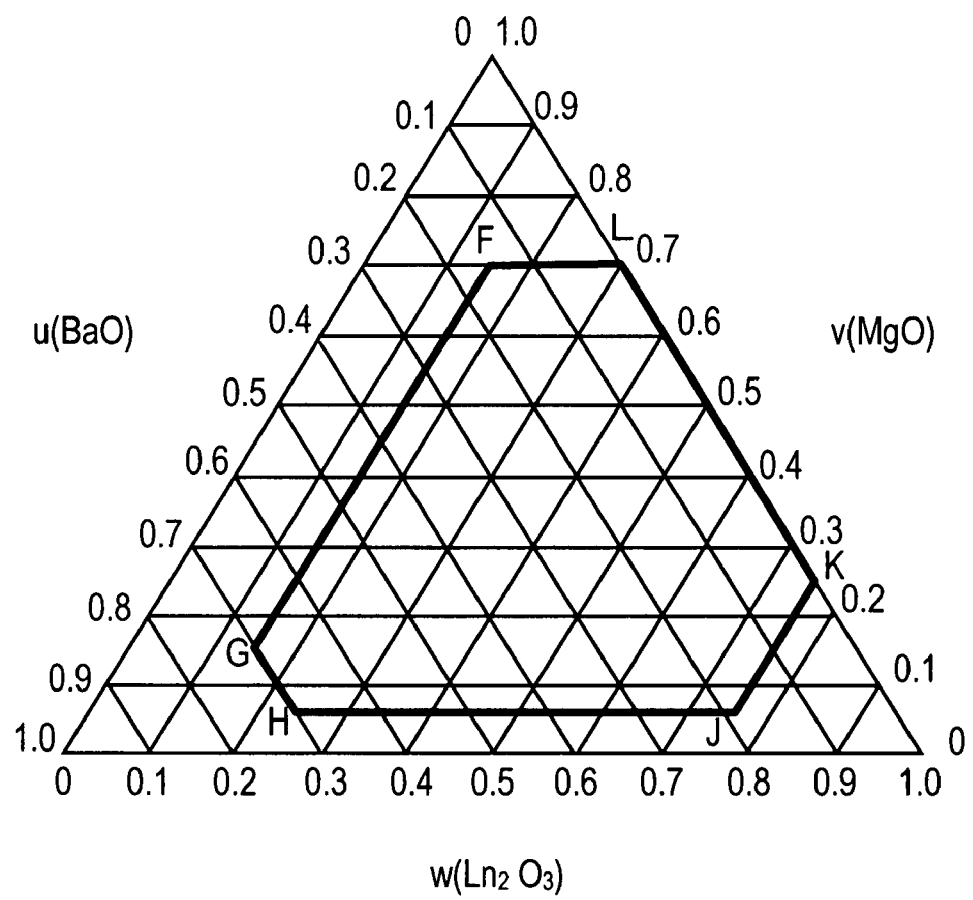
FIG. 3 shows a three-components constituent figure showing a constitutional ratio of Ba—Mg-Ln (u, v, w).

It is obvious from Table 6 that the laminated ceramic capacitors of sample numbers 25 to 30 using the dielectric ceramic composition of the present invention have a good dielectric constant and a good dielectric loss tangent (tan δ) value as initial performance, and deviation of these values is also small. Further, the temperature dependency of the insulation resistance and the capacitance variation rate, and the insulation resistance lifetime characteristics after the accelerated lifetime test are all good.

resistance lifetime characteristics are insufficient, and it is not practical. Further, in the case of sample number 33 that is the lower left part from a straight line connecting G and H, a sufficient sintering property can not be obtained, the insulation property degrades a little, the insulation resistance lifetime characteristics are also insufficient, and it is not practical. In the case of sample number 35 that is the lower part from a straight line connecting H and J, capacitance temperature characteristics are good. However, because the value of tan δ is large and reliability degrades, it is not suitable for the laminated ceramic capacitor having a dielectric layer of a thin film. In the case of sample number 34 that is the lower right part from a straight line connecting J and K, the sintering property is lost and it is not sintered. Furthermore, in the case of sample number 31 that is the upper part from a straight line connecting L and F, the sintering property can be obtained sufficiently. However, because the temperature characteristics show a deterioration tendency when it is made thin, it is not practical. Further, in the case of sample number 36 in which the addition of MgO is less than 0.15 mol, the value of tan δ becomes high, reliability has a tendency to deteriorate, and it is not practical even though the composition condition in the region surrounded with a hexagon with each point of F, G, H, J, K, and L as apexes of the three-components constituent figure in FIG. 3 is satisfied. On the other hand, in the case of sample number 38 in which MgO exceeds 2.5 mol, the temperature variation rate of capacitance of the laminated ceramic capacitor becomes large and the change of capacitance over time becomes large. Furthermore, in the case of sample number 37 in which a $BaCO_3$ component exceeds 1.6 mol, sintering becomes difficult and it is not practical either.

TABLE 6

| Sample number | Dielectric constant | tanδ (%) | IR(Ω) | dC/C(%)(−55° C.) | dC/C(%)(125° C.) | IR Degradation number |
|---|---|---|---|---|---|---|
| 25 | 2050 | 1.7 | 2.50E+10 | −10.2 | −11.0 | 0/50 |
| 26 | 2650 | 2.1 | 2.00E+10 | −8.7 | −9.5 | 0/50 |
| 27 | 2140 | 1.8 | 2.30E+10 | −11.1 | −12.1 | 0/50 |
| 28 | 2620 | 2.2 | 2.10E+10 | −9.2 | −10.5 | 0/50 |
| 29 | 2670 | 2.2 | 2.40E+10 | −11.2 | −12.3 | 0/50 |
| 30 | 2750 | 2.3 | 1.80E+10 | −10.0 | −11.2 | 0/50 |
| *31 | 2980 | 2.2 | 2.00E+10 | −16.2 | −17.2 | 0/50 |
| *32 | 3020 | 2.3 | 1.80E+10 | −12.2 | −15.7 | 3/50 |
| *33 | 3010 | 2.8 | 8.00E+09 | −11.8 | −12.9 | 3/50 |
| *34 | | | | Not sintered | | |
| *35 | 2430 | 3.2 | 8.00E+09 | −7.5 | −8.3 | 3/50 |
| *36 | 3250 | 3.7 | 8.00E+09 | −6.3 | −7.2 | 1/50 |
| *37 | | | | Not sintered | | |
| *38 | 3180 | 2.2 | 2.00E+09 | −13.2 | −17.5 | 0/50 |

*represents the range outside the present invention

Here, the added amount of the rare-earth oxides that is a sum of $Er_2O_3$, $Dy_2O_3$, and $Ho_2O_3$ is shown as $Ln_2O_3$ [Ln includes two or three kinds of elements selected from Er, Dy, and Ho with Er being essential]. Then, the three-components constituent figure when the mixing ratio of $BaCO_3$, MgO, and $Ln_2O_3$ is $uBaCO_3+vMgO+wLn_2O_3$ (u+v+w=1) is shown in FIG. 3. In FIG. 3, the coordinates of point F (u, v, w) are (0.15, 0.15, 0.7), the coordinates of point G (u, v, w) are (0.7, 0.15, 0.15), the coordinates of point H (u, v, w) are (0.7, 0.24, 0.06), the coordinates of point J (u, v, w) are (0.18, 0.75, 0.07), the coordinates of point K (u, v, w) are (0, 0.75, 0.25), and the coordinates of point L (u, v, w) are (0, 0.3, 0.7). In FIG. 3, in the case of sample number 32 that is the left part from a straight line connecting F and G, the ratio of the added amount of the rare-earth oxides becomes small, the insulation The added amount of the rare-earth oxides preferably satisfies a composition condition in the region surrounded with a quadrangle with A, B, D, and E as each apex of the three-components constituent figure shown in FIG. 2 in the range of 0.1 to 3 mol as shown in Embodiments 1 and 2. Furthermore, MgO is preferably added in a form of $Mg(OH)_2$ because dispersibility is stable. Furthermore, MgO with a particle diameter of 0.2 µm or less and a specific surface area of 20 $m^2/g$ or more is preferably used. By using each rare-earth oxide with a specific surface area of 7 to 15 $m^2/g$, a spherical shape, and fewer cohesion particles as in Embodiments 1 and 2, dispersibility improves and the above-described effect becomes remarkable. Moreover, as far as the same effect can be obtained, the rare-earth element is not limited to a form of an oxide and may be a form of a hydroxide or the like.

Embodiment 4

It is based on a composition in which 0.4 mol of $BaCO_3$, 2 mol of MgO, 0.3 mol of $Er_2O_3$, 0.3 mol of $Dy_2O_3$, 0.4 mol of $Ho_2O_3$, 0.2 mol of Mn as $MnO_{4/3}$, 0.6 mol of $SiO_2$, 0.15 mol of $V_2O_5$, and 0.25 mol of $Al_2O_3$ are added to 100 mol of $BaTiO_3$. Then, laminated chip capacitor 11 having a cross-section structure shown in FIG. 1 is produced in the same manner as in Embodiments 1 to 3 using the dielectric ceramic composition in which the added amount of each accessory component of $MnO_{4/3}$, $SiO_2$, $V_2O_5$, and $Al_2O_3$ shown in Tables 7 to 10 are added into the base composition. Here, $BaTiO_3$ with a Ba/Ti molar ratio of 1.001, a specific surface area of 4.3 $m^2$/g obtained by a BET method, and in which the x-ray diffraction angle 2θ in the x-ray diffraction chart in the range of 40 to 50° is separated into two peaks of the (002) plane and the (200) plane is used for $BaTiO_3$. Then, the dielectric constant and the dielectric loss tangent (tan δ) are measured at a temperature of 20° C. and a frequency of 1 kHz on produced laminated ceramic capacitor 11.

TABLE 7

| Sample number | $MnO_{4/3}$ |
|---|---|
| *39 | 0 |
| 40 | 0.01 |
| 41 | 0.26 |
| *42 | 0.48 |

*represents the range outside the present invention

TABLE 8

| Sample number | $SiO_2$ |
|---|---|
| *43 | 0.2 |
| 44 | 0.3 |
| 45 | 3.5 |
| *46 | 4.0 |

*represents the range outside the present invention

TABLE 9

| Sample number | $V_2O_5$ |
|---|---|
| *47 | 0 |
| 48 | 0.01 |
| 49 | 0.26 |
| *50 | 0.28 |

*represents the range outside the present invention

TABLE 10

| Sample number | $Al_2O_3$ |
|---|---|
| *51 | 0 |
| 52 | 0.01 |
| 53 | 2.5 |
| *54 | 2.7 |

*represents the range outside the present invention

Further, a value of which the difference dC of a capacitance value measured in the temperature range of −55 to +125° C. from a capacitance value C at a temperature of 25° C. is calculated as the capacitance variation rate in which the difference is divided by the capacitance value C at 25° C. as dC/C (%), and the result is shown in Tables 11 to 14, respectively, as the characteristic of laminated ceramic capacitor having the compositions in Tables 7 to 10. Moreover, sample numbers in Tables 11 to 14 correspond to the sample numbers in Tables 7 to 10.

Further, an insulation resistance value (Ω) when a direct current voltage of 25 V is applied at room temperature is also shown. Furthermore, the IR degradation number after an accelerated lifetime test is performed in which a DC voltage of 100V is continuously applied for 250 hours at a temperature of 125° C. is shown in Tables 11 to 14. Here, the IR degradation number is a number obtained by measuring the insulation resistance value of 50 samples after the accelerated lifetime test and counting the sample whose insulation resistance value is degraded to $1 \times 10^7 \Omega$ or less as degradation failures. The notation of the insulation resistance value is the same as Table 2. In Tables 7 to 14, * represents a laminated ceramic capacitor sample using a dielectric ceramic composition consisting of a composition outside the range of the present invention.

TABLE 11

| Sample number | Dielectric constant | tanδ (%) | IR(Ω) | dC/C(%)(−55° C.) | dC/C(%)(125° C.) | IR Degradation number |
|---|---|---|---|---|---|---|
| *39 | 3050 | 3.2 | 8.00E+08 | −10.2 | −12.1 | 1/50 |
| 40 | 3040 | 2.4 | 1.70E+10 | −10.2 | −12.4 | 0/50 |
| 41 | 2850 | 2.2 | 1.50E+10 | −11.2 | −14.2 | 0/50 |
| *42 | 2790 | 1.7 | 1.00E+09 | −13.8 | −15.6 | 0/50 |

*represents the range outside the present invention

TABLE 12

| Sample number | Dielectric constant | tanδ (%) | IR(Ω) | dC/C(%)(−55° C.) | dC/C(%)(125° C.) | IR Degradation number |
|---|---|---|---|---|---|---|
| *43 | 1920 | 1.8 | 8.00E+09 | −10.2 | −11.9 | 2/50 |
| 44 | 3010 | 2.2 | 1.80E+10 | −11.2 | −12.8 | 0/50 |
| 45 | 2850 | 2.1 | 2.10E+10 | −11.7 | −12.4 | 0/50 |
| *46 | 1760 | 3.5 | 2.60E+10 | −10.9 | −9.6 | 0/50 |

*represents the range outside the present invention

TABLE 13

| Sample number | Dielectric constant | tanδ (%) | IR(Ω) | dC/C(%)(−55° C.) | dC/C(%)(125° C.) | IR Degradation number |
|---|---|---|---|---|---|---|
| *47 | 3060 | 3.2 | 1.20E+08 | −10.4 | −11.2 | 15/50 |
| 48 | 2950 | 2.2 | 1.70E+10 | −11.0 | −12.1 | 0/50 |
| 49 | 2850 | 2.1 | 2.10E+10 | −11.6 | −13.2 | 0/50 |
| *50 | 2780 | 2.7 | 2.10E+09 | −12.3 | −17.9 | 0/50 |

*represents the range outside the present invention

TABLE 14

| Sample number | Dielectric constant | tanδ (%) | IR(Ω) | dC/C(%)(−55° C.) | dC/C(%)(125° C.). | IR Degradation number |
|---|---|---|---|---|---|---|
| *51 | 2850 | 1.9 | 1.00E+08 | −12.4 | −15.8 | 2/50 |
| 52 | 2980 | 2.1 | 2.50E+10 | −11.2 | −12.6 | 0/50 |
| 53 | 3090 | 2.4 | 2.20E+10 | −11.8 | −13.2 | 0/50 |
| *54 | 3330 | 4.8 | 1.00E+10 | −6.0 | −11.0 | 2/50 |

*represents the range outside the present invention

The characteristic of the laminated ceramic capacitor using the dielectric ceramic composition in which $MnO_{4/3}$ shown in Table 7 is added is shown in Table 11. It is obvious from Table 11 that the addition of $MnO_{4/3}$ can prevent the reduction of titanium oxide ($TiO_2$). Then, also in the case of sintering a large amount of green chips once in a neutral atmosphere or in a reduced atmosphere, the degrading of the insulation resistance value is prevented and also deviation of capacitance is suppressed, and there is an effect that a uniform sintered body can be obtained. However, in sample number 39 in which the added amount of $MnO_{4/3}$ is less than 0.01 mol, the sintered body is made partially semiconductive, deviation of capacitance becomes large, and the insulation resistance value becomes small. As the result, the insulation resistance value degrades broadly in the accelerated lifetime test. Further, when $MnO_{4/3}$ exceeds 0.4 mol, the temperature variation rate and variation rate over time of the capacitance become large, and the degradation of the insulating resistance also becomes large. Therefore, 0.01 to 0.4 mol of Mn is effectively added in terms of $MnO_{4/3}$ to 100 mol of $BaTiO_3$.

Further, it is obvious from the result in Table 13 showing that the characteristic of the laminated ceramic capacitor using the dielectric ceramic composition in which $V_2O_5$ shown in Table 9 is added that the addition of $V_2O_5$ has the effects of suppressing the reduction of $TiO_2$, making the insulation resistance high, and preventing lifetime degradation of the insulation resistance. However, when the added amount of $V_2O_5$ exceeds 0.26 mol, the temperature dependency of the capacitance variation rate becomes large as in sample number 50, and the insulation resistance value degrades. Further, when it is less than 0.01 mol, in addition to a low insulation resistance as shown in sample number 47, the insulation resistance degrades after the accelerated lifetime test. Therefore, the added amount of $V_2O_5$ is effectively 0.01 to 0.26 mol to 100 mol of $BaTiO_3$.

Further, it is obvious from the result in Table 12 showing that the characteristic of the laminated ceramic capacitor using the dielectric ceramic composition in which $SiO_2$ shown in Table 8 is added that the addition of $SiO_2$ has the effects of promoting the sintering of dielectric layer 12 in sintering at a relatively low temperature, and making deviations of the capacitance value and the insulation resistance value. However, in the case of sample number 43 in which the added amount of $SiO_2$ is less than 0.3 mol, the sintering property is not sufficient, and there is also a deterioration tendency of lifetime characteristics of the insulation resistance. Further, in the case of sample number 46 in which the added amount of $SiO_2$ exceeds 3.5 mol, the sintering property becomes non-uniform, the value of tan δ deteriorates, and it is not practical. The dielectric ceramic composition of the present invention easily generates a second phase. When the second phase is formed, there is a fear that the mechanical strength of the laminated ceramic capacitor degrades. However, furthermore, it is obvious from the result in Table 14 showing that the characteristic of the laminated ceramic capacitor using the dielectric ceramic composition in which $Al_2O_3$ shown in Table 10 is added that by adding $Al_2O_3$, generation of the second phase can be suppressed, and the mechanical strength can be improved without deteriorating the characteristics. However, in the case of sample number 54 in which the added amount of $Al_2O_3$ exceeds 2.5 mol, the value of tan δ becomes large, and in sample number 51 in which it is less than 0.1 mol, the adding effect is not shown remarkably, the capacitance variation rate at the temperature characteristics is large, the insulation property is slightly poor, and the insulation resistance lifetime characteristics also tend to be disadvantageous. Moreover, this $Al_2O_3$ is added after other starting materials are calcined. $Al_2O_3$ may be added first similarly to other starting materials. However, by adding after the calcination, the temperature characteristics of capacitance can be further improved. The additives having as much as a large specific surface area and good dispersibility are preferably used. Especially, special attention is necessary for $Al_2O_3$ because it is added after the calcination, and $Al_2O_3$ having a specific surface area of 100 m²/g is used in the present Embodiment.

From the above results, laminated ceramic capacitor 11 in which the reduction of the dielectric body is prevented in sintering in the reduced atmosphere and the insulation resistance performance is improved can be obtained by having $BaTiO_3$ of the present invention as a main component and adding $BaCO_3$, $MgO$, $Er_2O_3$, $Dy_2O_3$, $Ho_2O_3$, $MnO_{4/3}$, $SiO_2$, $V_2O_5$, and $Al_2O_3$ thereto. Further, by adding $Al_2O_3$, laminated ceramic capacitor 11 can be obtained in which the generation of the accessory components on the surface of sintered body 15 is suppressed. Furthermore, by limiting the adding ratio of $Er_2O_3$, $Dy_2O_3$, and $Ho_2O_3$ and the adding ratio of $BaCO_3$, MgO, and ($Er_2O_3+Dy_2O_3+Ho_2O_3$), substituting $Mg(OH)_2$ for MgO, laminated ceramic capacitor 11 having a dielectric layer of 5 μm or less can be obtained which is superior in capacitance temperature characteristics and insulation resistance.

Moreover, the laminated ceramic capacitor of the present invention has superior electric characteristics as well as in the case of forming the external electrodes of the laminated ceramic capacitor using a precious metal such as silver.

INDUSTRIAL APPLICABILITY

The dielectric ceramic composition according to the present invention is a dielectric ceramic composition containing at least 0.15 to 2.5 mol of a Mg compound in terms of MgO, 0 to 1.6 mol of a Ba compound in terms of $BaCO_3$, 0.1 to 3.0 mol of a Ln [Ln includes two or three kinds of elements selected from Er, Dy, and Ho with Er being essential] compound in terms of $Ln_2O_3$, 0.01 to 0.4 mol of a Mn compound in terms of $MnO_{4/3}$, 0.01 to 0.26 mol of a V compound in terms of $V_2O_5$, 0.3 to 3.5 mol of a Si compound in terms of $SiO_2$, and 0.01 to 2.5 mol of an Al compound in terms of $Al_2O_3$ as accessory components to 100 mol of $BaTiO_3$ adjusted the Ba/Ti molar ratio to 0.997 to 1.007 as a main component, and for example, it is useful in a laminated ceramic capacitor of a small size and large capacity including a dielectric layer of 5 μm or less because the dielectric layer is not reduced even being sintered using a base metal such as Ni in the inner electrodes and being baked using a base metal such as Cu in the external electrodes and it has superior insulation resistance characteristics.

The invention claimed is:

1. A dielectric ceramic composition containing at least 0.15 to 2.5 mol of a Mg compound in terms of MgO, 0 to 1.6 mol of a Ba compound in terms of $BaCO_3$, 0.1 to 3.0 mol of a Ln compound in terms of $Ln_2O_3$, 0.01 to 0.4 mol of a Mn compound in terms of $MnO_{4/3}$, 0.01 to 0.26 mol of a V compound in terms of $V_2O_5$, 0.3 to 3.5 mol of a Si compound in terms of $SiO_2$, and 0.01 to 2.5 mol of an Al compound in terms of $Al_2O_3$ as accessory components to 100 mol of barium titanate adjusted for a Ba/Ti molar ratio of 0.997 to 1.007 as a main component, wherein, the Ln includes Er as an essential component and further includes at least one of Dy and Ho, and wherein, when the Ln compound is represented by a formula x $Er_2O_3$+y $Dy_2O_3$+z $Ho_2O_3$, a composition of the Ln compound is in the range of a quadrangle with the following A, B, D, and E as each apex in a three-component constituent figure showing x, y, and z in a molar ratio, A: (x, y, z)=(0.05, 0, 0.95)
B: (x, y, z)=(0.5, 0, 0.5)
D: (x, y, z)=(0.5, 0.5, 0), and
E: (x, y, z)=(0.05, 0.95, 0),
where x+y+z=1.

2. The dielectric ceramic composition according to claim 1, wherein when a composition ratio of the $BaCO_3$, the MgO, and the $Ln_2O_3$ among the accessory components is represented by a formula u $BaCO_3$+v MgO+w $Ln_2O_3$, u, v and w are in the range of a hexagon with the following E, F, G, H, J, K, and L as each apex in a three-component constituent figure showing u, v, and w in a molar ratio, F: (u, v, w)=(0.15, 0.15, 0.7),
G: (u, v, w)=(0.7, 0.15, 0.15),
H: (u, v, w)=(0.7, 0.24, 0.06),
J: (u, v, w)=(0.18, 0.75, 0.07),
K: (u, v, w)=(0, 0.75, 0.25), and
L: (u, v, w)=(0, 0.3, 0.7),
where u+v+w=1.

* * * * *